July 12, 1955

A. D. WILT, JR 2,712,775

MACHINES FOR MANUFACTURING DRILLS, TAPS AND OTHER ARTICLES

Filed Jan. 8, 1954

INVENTOR.
ABRAM D. WILT, JR.
BY Curtis, Morris & Safford
ATTORNEYS

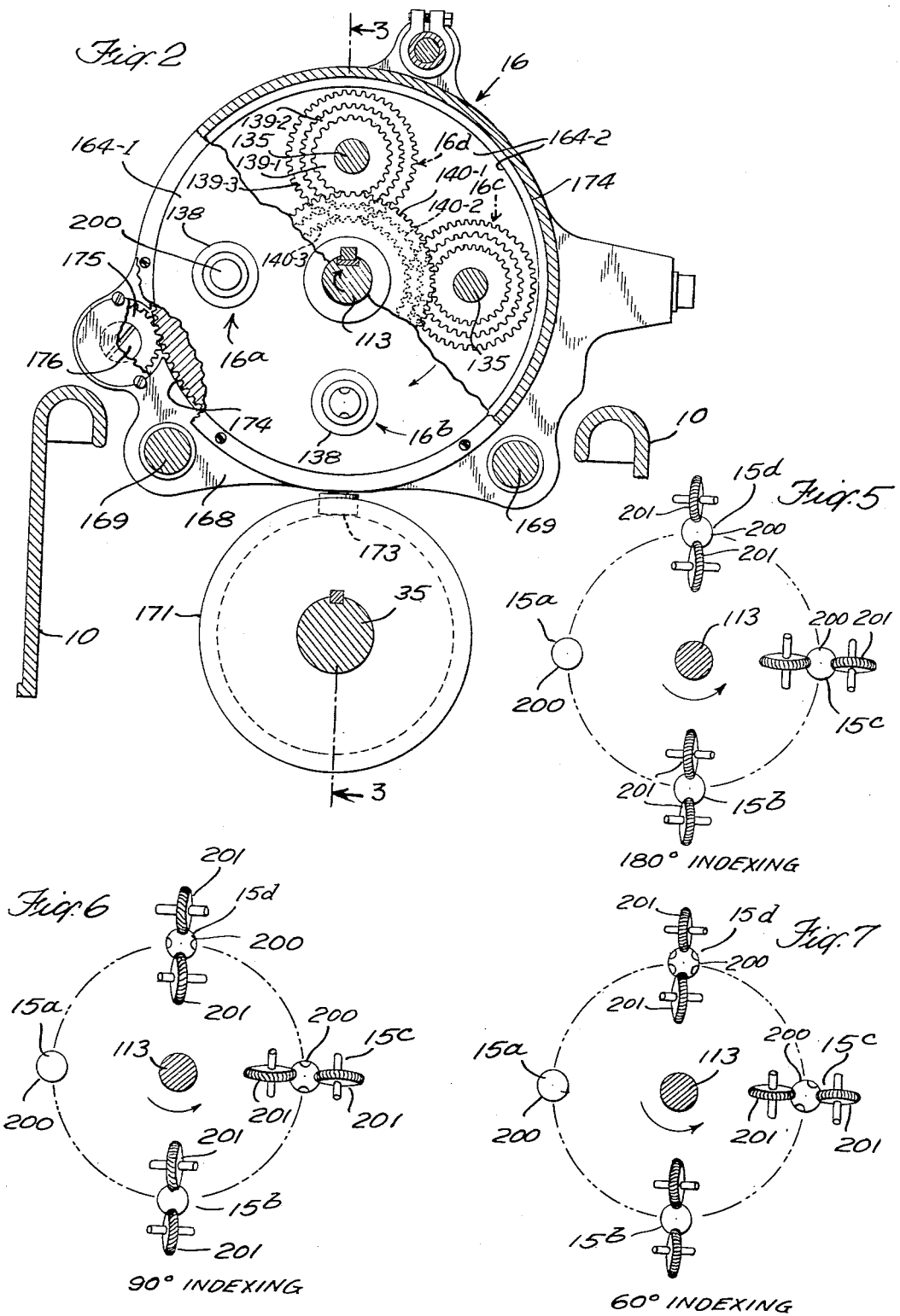

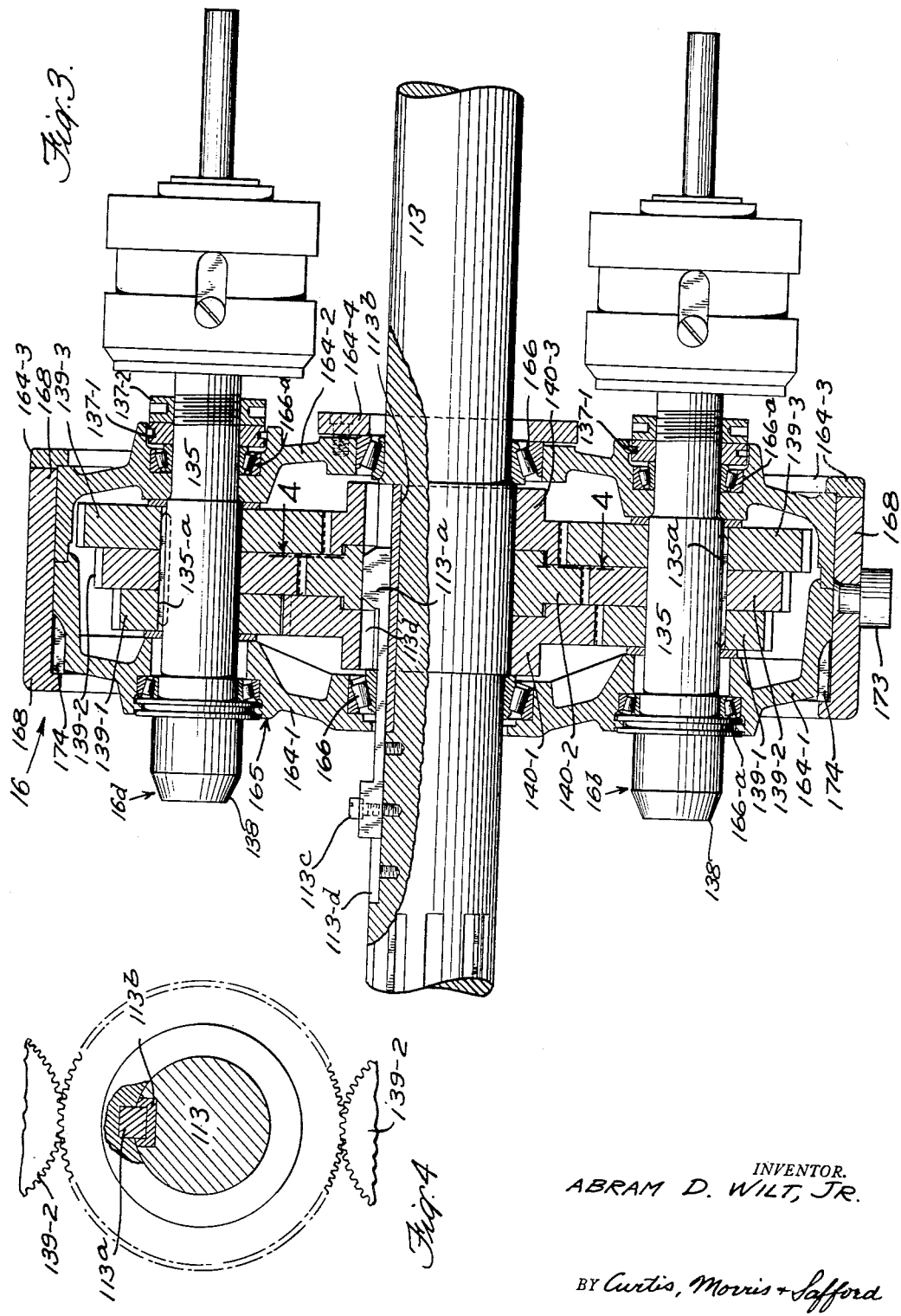

United States Patent Office 2,712,775
Patented July 12, 1955

2,712,775
MACHINES FOR MANUFACTURING DRILLS, TAPS, AND OTHER ARTICLES

Abram D. Wilt, Jr., New Canaan, Conn.

Application January 8, 1954, Serial No. 403,020

2 Claims. (Cl. 90—11.48)

This invention relates to improvements in automatic machines designed for the manufacture of twist drills, tap-blanks and the like, from a bar of raw stock, the general organization and characteristics being similar to the machine disclosed in the patent to A. D. Wilt, Jr. No. 1,918,626, upon which said machine, the present improvements are based and to which patent reference may be made for details herein not specifically described.

In the automatic machine described in the patent, the several operations of cutting the stock and machining and finishing the tap-blanks, drills or other articles are performed successively at a plurality of work stations, the various operations being performed simultaneously at the several stations. There is provided a tool holder or head which carries a plurality of grooving cutters for fluting the blank and other cutters for performing other operations. This tool holder or head cooperates with a turret or blank carrier for holding the several blanks or pieces of stock. The turret is provided with collets or other devices for holding the blanks in position to be operated upon at the various tool stations. The blanks, after being circumferentially grooved and severed from the bar stock are received and held in the collets or chucks and by rotation of the turret, controlled by index mechanism, are carried from station to station for the performance of the various work operations. In this way, as all the chucks of the turret are successively provided with blanks, a different operation of work is being carried on at each tool station, and then by the rotation of the turret the blanks are moved to the next work station for the next succeeding operation or are expelled from the machine as the case may be. It will be seen then that there is correlation between the work performed at one station and that performed at the next station.

The machine of the patent was described more particularly in its application for making taps. The subject matter of the present invention is concerned more specifically with improvements in the blank carrier turret head which will enable it to make a greater range of articles requiring one or more operations such as milling of grooves or flutes on twist drills, reamers, end mills, tap blanks and auger bits. In its general operation the activating elements of the patent are applicable for the same purpose or purposes in the present case in so far as they concern the present invention. The general object of this invention consists in improvements to machines of this type, the nature and purpose of which will be described in detail by reference to the accompanying drawings.

The objects of this invention may be accomplished by the use of the apparatus described herein and illustrated in the drawings in which:

Fig. 2 is a transverse section of certain parts particularly of the work carrier taken on line 2—2 of Fig. 1, looking to the right.

Fig. 3 is a sectional elevation of parts of the work carrier taken on line 3—3 of Fig. 2.

Fig. 4 is a detail section of a sun gear and two cooperating planet gears— taken on line 4—4 of Fig. 3, and Figs. 5, 6 and 7 are diagrammatic showings of the arrangement of cutting tools operating at the several tool stations in cases where two, four or six spiral grooves or flutes are to be formed in the work blank.

Like reference characters refer to like parts throughout the different views of the drawings.

Figure 1:
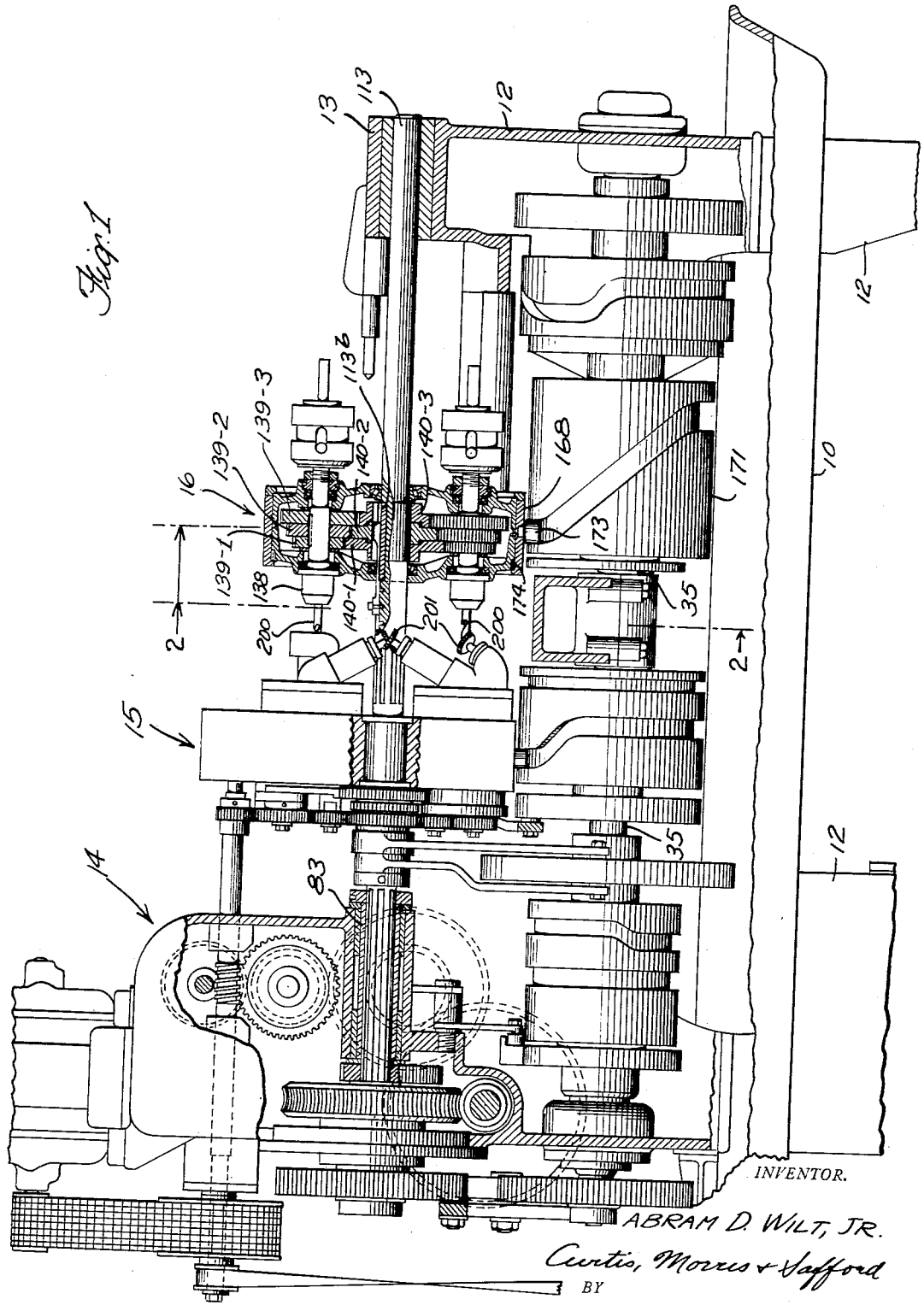
Fig. 1 is a side elevation, partly in section, showing the location of the turret head assembly and the general arrangement for motivating this head and its component parts.

In order that the action of the mechanisms directly cooperate with the turret and its component parts may be readily understood by reference to the present drawings, mention is here made of certain elements of Patent No. 1,918,626, shown or indicated therein which relate to the present machine.

The general structure of the machine comprises a frame 10 and supporting legs 12—12. Upon the frame is mounted a head generally indicated as 14, which contains the main driving mechanism. A tool holder 15 supports the cutting tools, a turret 16 carries the blanks or pieces of stock, step by step, to the various work positions. Means not pertinent to the present invention and not shown specifically in the present drawings function for feeding in raw stock, cutting it off and preparing it to be taken and held by the chucks of the turret head 16. Also the frame supports an index mechanism of known construction for rotating the turret head chucks to proper position at the successive stations, and chuck locking mechanism for clamping the blank in the collets or chucks, generally as disclosed in the said patent. As shown here the turret 16 is equipped with four blank holders, instead of five as shown in the patent, spaced equidistantly about the center driving shaft 113; and the tool holder 15 also has four working points or stations. The shaft 113 extends from proper gearing in the head of the machine, through the center of both the tool holder 15 and the blank holder 16.

A like shaft 113 is shown in the present drawings, as is also a timing shaft 35 which is driven by appropriate head gearing and is provided with suitable cams or like devices for effecting cyclic operation of the machine. Shaft 113 is splined in a gear driven sleeve 83 mounted in the head 14 of the machine and the shaft rotates constantly, while the machine is in operation, and also may reciprocate in and out of the head of the machine on its own bearing 13, when in and out movement is imparted thereto by the action of the turret toward and away from the tool holder 15. The object of the rotation and reciprocation of the shaft 113 will appear later herein.

The cutting mechanism proper of the present invention consists of a turret 16 carrying four equally spaced blank carriers 138, such as collets, mounted at equal distances around a circle. Opposite each collet, as will be understood, is a tool head working station and, since at regular intervals the turret is indexed and the blank carrier revolved 180° for machining two grooves equally spaced, 90° for four grooves equally spaced or 60° for six grooves also equally spaced, see Figs. 5, 6 and 7, it will be seen that in each case, after a pre-determined number of such intervals, each collet will have been located once at each one of the several working stations and finally have returned to its original position.

*Turret or blank carrier assembly*

As stated above the location of the carrier is shown in Fig. 1 in relation to the other elements of the machine above mentioned, for more complete details of which refer to Patent No. 1,918,626.

The blank carrier assembly (Figs. 1 and 3) is supported by and driven by shaft 113. On this shaft are mounted sun gears 140–1, 140–2 and 140–3 which are selectively keyed thereto by an axially sliding shift key 113a, registering selectively with a keyway 113d in any one of the three sun gears, as shown in Figs. 3 and 4. Shift key 113a slides in a key retainer 113b which is secured within a keyway 113d formed in shaft 113. The key 113a is held in a pre-selected position by a screw 113c which is positioned in the keyway 113d to place shift key 113a in registry with a cooperating keyway in the selected sun gear. As shown in Fig. 3 the sun gear 140–2 is keyed to the shaft to render planet gears 139–2 operable. The shift key may be shifted axially to register with either one of the three sun gears 140–1, 140–2, or 140–3 when the set screw 113c is loosened.

The four chucks or collets are of the same construction as in the said patent. Each comprises a shaft 135 upon which are keyed side by side the three planet gears 139–1, 139–2 and 139–3 which mesh with the three sun gears, but as the sun gears are each of different diameter, so are the three planet gears mounted on each shaft 135, thereby providing three different gear ratios for varying the extents of angular movement of the planet gears and work blanks. The four chucks 16a, 16b, 16c and 16d are exact duplicates of each other and are held in the rotating turret 165 in any suitable manner.

The rotating turret is made in two joined halves 164–1 and 164–2 which are supported and held in place on shaft 113 by means of double cone bearings 166, which shaft, as said above, reaches from the driving head 14 to its bearing 13 at the right end of the machine. The turret 165 fits into a turret casing 168 which also forms a support therefor. The three planetary gear systems are enclosed in rotatable housings comprising the two halves 164–1 and 164–2 which form the sides of the turret 165. The housings are held together in the casing by a retaining plate 164–3 and the collet bearings 166–a are adjusted for take up by take up collars 137–1 and lock nuts 137–2. Bearings 166 are held in place by a retaining plate 164–4.

It will be seen from the above that the planets of each of the four planetary systems are keyed to their respective shafts 135 by means of a key 135–a and that with rotation of either sun 140–1, 140–2 or 140–3 in bearings 166, all planetary gears 139–1, 139–2 or 139–3 are rotated on shaft 135 in bearings 166a. All are thus mounted in groups of three on each of four shafts 135 which support and actuate the collets 138.

Gear teeth 174 cut in the outer surface of rotating turret or ring-gear 164–1 are in mesh with a gear pinion 175 mounted on a shaft 176, which is caused to rotate intermittently to turn the turret to each of its four blank cutting positions. The drive connections to shaft 176 are fully set forth in the Patent No. 1,918,626, so need no further description here. The intermittent rotary movement is controlled during each index period of operation in a known manner by means associated with the cam shaft 35.

The turret head structure slides on guide rods 169 supported in the frame 10 (see Fig. 2). On the lower side of the turret casing 168 is mounted a cam roller 173 which co-acts with a cam groove cut in the surface of barrel cam 171 which is mounted on the cycle shaft 35. This, in a known manner, causes the turret structure to reciprocate and move the work blanks in and out of operative relation to the cutting tools in timed relation to the relative rotary movements of gear 174 and the continuous rotations of the collets in order that the turret may be free to revolve to a new index position. At the end of the linear movement of the turret to the right, known mechanism is rendered effective to eject a finished work piece (tap-blank, drill or otherwise) out of the collet jaws of one of the collets 138. By reason of the different gear ratios between the respective sun and planetary gears, and the kinematic chain action relating the movements of the planetary gears with the rotation of the turret (180° indexing as per Fig. 5, 90° indexing as per Fig. 6 and 60° indexing as per Fig. 7) blank carriers 138 can successively present each blank to the four working stations exactly to have 2, 4 or 6 spiral grooves cut therein. Specifically a blank may have 2, 4 or 6 helical flutes formed therein depending upon the indexing angle selected.

Operation

From the above description of the present improved turret and mechanisms their mode of operation in relation to the operation of the machine may be readily understood. In order to make clear some of the various features of the operation, reference is here made to the disclosures of Figs. 5, 6 and 7 of the drawings.

Fig. 5 shows the application of the improved machine to the making of twist drills having two helical flutes. Shown diagrammatically are the four stations 15a, 15b, 15c and 15d at which work is done upon the blanks, presented to the selected cutting tools, when the turret has been advanced by its operating mechanism into operative relation at the several tool stations. At the first station 15a a blank 200 may be cut off from a bar of stock, pointed or pointed and turned, and then gripped by a collet of the turret. At the second, third and fourth stations, 15b, 15c and 15d, there are operatively mounted pairs of milling cutters 201 which are mounted opposite each other with respect to the blank 200 and thus cut two opposite helical grooves simultaneously as the collet feeds the blank into the tools with a combined advancing and rotary motion, an exact combination of these two motions being required to produce twist drills, or any other article receiving helical milling cuts of a preselected pitch. The third station 15c has a pair of similarly disposed milling cutters for taking a finishing cut from the grooves which have been rough cut at the second station. At the fourth station the cutters are set to cut the body clearance in the usual manner of finishing twist drills. The drill blank which has been operated on at the various cutting stations is discharged in the manner described in the above referred to patent from the collet which holds it, while the turret is indexing over from the fourth station 15d to the first station 15a.

It will be understood that each time one of the collets arrives at station 15a it receives a blank work piece so that at the end of each cycle of operations each of the collets holds a blank within its jaws. Thus with every reciprocation of the turret four different operations are simultaneously performed upon the several blanks.

The rate of advance of the turret toward the cutters is controlled by cam 171 (Figs. 1 and 2) on cam shaft 35, one full revolution of which is equivalent to one full working cycle with one complete indexing for the angle selected for operation. The rotary motion of the individual collets during the advance into the cutters is caused by actuation of a planetary pinion 139–1, 139–2 or 139–3 on each collet shaft, all four of the sets of planetary gears being driven by the operative sun gear 140–1, 140–2 or 140–3 mounted on the shaft 113 which is disposed centrally of the turret, and which rotates continuously, even during the indexing of the turret. As said above, the three planetary gear systems provide three operative gear ratios to determine the degree of angular movement of the collets about their axes while passing from one station to the next.

In making articles with 2, 4 or 6 grooves or flutes the tool holders at each successive station are mounted at a predetermined angle relatively to the position at the previous station. Thus it is essential that the blank 200 when entering any subsequent station should be located with its previously cut grooves 180°, 90°, or 60° from the position at which it was previously tooled. Thus the degree of angular movement made by the blank during the indexing period depends on the resultant movement derived from the rate of angular movement of the turret, the rate at which the carrier returns to the position of engagement of the blank with the tools and the rate of rotation of the planet pinion. As the mathematics involved is well understood in the art, it is believed that these relationships need no further explanation.

From the above description it will be understood that for each indexing, the combined planetary gear systems rotate the blank carrier a previously selected number of degrees, depending on the gear ratio of the particular planetary system which is then engaged by key 135a. Thus for indexing positions the kinematic relation between gears 174, 139–1, 139–2 and 139–3, 140–1, 140–2 and 140–3 must be predetermined for each different system in the turret head 165 to make articles with 2, 4 or 6 helical flutes. When properly designed, the present machine is universal for a number of different selected operations and this universality results from having plural, selectively operable planetary gear systems; this universal characteristic enables the machine to produce, if desired, articles with helical grooves or flutes having different pitches and makes it a simple matter to establish the necessary proper relationship of these planetary systems to produce the desired result.

In carrying out the operation for 180°, indexing for 2 grooves equally spaced, the blank is chucked at station 1 on the left sides of Figs. 5–7, respectively; and the first milling cut is taken at station 2. This can be a roughing cut in the making of two fluted twist drills, end mills, and double twist auger bits. A second milling cut may be taken at station 3 and can be a finishing cut. The final cut may be taken at station 4 and, in the making of articles such as most kinds of twist drills and two fluted spiral end mills the cutters may be used for milling clearance. This is illustrated in Fig. 5.

For 90° indexing for 4 grooves equally spaced, e. g. for 4 groove tap blanks, the first milling cut of two opposite grooves is taken at station 2, Fig. 6, and is usually a final cut on two of the four grooves. The second milling cut is taken at station 3 and also is a final cut. Station 4 in such case would ordinarily be idle with the milling cutters removed. In the making of solid center anger bits the milling cutters at station 4 remove the material remaining between two of the grooves cut at Station 2.

For 60° indexing for 6 grooves or flutes equally spaced, the first milling cut is taken at the station 2, the second at station 3 and the last at station 4. All of these are final cuts in the making of such articles as six fluted reamers.

From the foregoing it will be seen that this invention is one well adapted to accomplish the various ends and objects hereinbefore set forth, in a simple and practical manner, and to have many other advantages over machines of the same type which are lacking in the universal characteristics inherent in machines made in accordance with the present invention.

To those skilled in the art of making machines of the class described, many alterations in construction and widely different applications of this invention will suggest themselves, without departing from the spirit and scope as set forth in the claims. The drawings and descriptions herein are purely illustrative and are not intended to be limiting.

I claim:

1. In a machine for cutting helical flutes in work pieces, a main frame, a center driving shaft mounted for rotation in said main frame and defining a keyway therein, a mechanism to rotate said shaft at constant speed, a turret head rotatably supported on said main frame concentrically around said shaft, a plurality of work carriers rotatably mounted on said turret head, means to axially move said turret head between two positions, means for indexing said turret head through a predetermined angle at one position of its axial movement, means to rotate said work carriers upon their respective axes during said axial movement and simultaneously with indexing of said turret head, said means to rotate comprising a plurality of planet gears affixed to each of said work carriers, a plurality of sun gears engaged with said planet gears freely mounted upon and selectively connectable to said driving shaft, and keying means operatively mounted in said keyway and axially movable therein to selectively connect one of said sun gears to said center driving shaft.

2. In a machine of the class provided with a main frame, a center driving shaft mounted for rotation in said main frame, a mechanism for rotating said driving shaft at constant speed, a turret head axially slidably disposed and rotatably supported on said main frame, a plurality of work carries rotatably mounted on said turret head, means to axially move said turret head, means for indexing said turret head through a pre-set angle about its own axis at an extreme of its axial movement, and means to rotate each of said work carriers through a first pre-set angle about its own axis during said axial movement of said turret head, and through a second pre-set angle simultaneously with said indexing, the improvement in said means to rotate comprising a plurality of planet gears secured to each of said work carriers, a plurality of sun gears meshed with said planet gears freely mounted on said center driving shaft and selectively connectable thereto, said driving shaft defining an axial keyway, keying means slidably disposed in said keyway to selectively connect one of said sun gears to said shaft, whereby the angle of helix resulting from rotation of said work carrier during axial movement of said turret head as well as the angular displacement of said work carrier resulting from rotation thereof during said indexing are governed by keying a particular sun gear to said shaft.

References Cited in the file of this patent

UNITED STATES PATENTS

| | | |
|---|---|---|
| 1,918,626 | Wilt, Jr. | July 18, 1933 |
| 2,350,406 | Leisner et al. | June 6, 1944 |

FOREIGN PATENTS

| | | |
|---|---|---|
| 16,680 | Great Britain | Nov. 25, 1915 |